United States Patent
Kikuchi

(10) Patent No.: US 8,515,254 B2
(45) Date of Patent: Aug. 20, 2013

(54) VIDEO EDITING APPARATUS AND VIDEO EDITING METHOD

(75) Inventor: Toru Kikuchi, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 201 days.

(21) Appl. No.: 13/049,111

(22) Filed: Mar. 16, 2011

(65) Prior Publication Data

US 2011/0255845 A1  Oct. 20, 2011

(30) Foreign Application Priority Data

Apr. 20, 2010 (JP) ................................ 2010-097422

(51) Int. Cl.
*H04N 5/76* (2006.01)

(52) U.S. Cl.
USPC ......................................... 386/278; 386/239

(58) Field of Classification Search
None
See application file for complete search history.

(56) References Cited

U.S. PATENT DOCUMENTS

| | | | |
|---|---|---|---|
| 6,061,494 A | 5/2000 | Kikuchi | |
| 6,243,529 B1 | 6/2001 | Takayama et al. | |
| 6,421,498 B1 | 7/2002 | Fukuoka et al. | |
| 2004/0136689 A1* | 7/2004 | Oka | 386/52 |
| 2007/0003256 A1* | 1/2007 | Mochizuki | 386/112 |
| 2008/0172411 A1 | 7/2008 | Kikuchi | |
| 2009/0009651 A1* | 1/2009 | Takayanagi | 348/345 |
| 2009/0052734 A1 | 2/2009 | Hosaka et al. | |
| 2009/0153579 A1* | 6/2009 | Ichikawa et al. | 345/589 |

FOREIGN PATENT DOCUMENTS

| | | |
|---|---|---|
| JP | 2009-055152 A | 3/2009 |
| WO | 2010/067740 A1 | 6/2010 |

* cited by examiner

*Primary Examiner* — Huy T Nguyen
*Assistant Examiner* — Eileen Adams
(74) *Attorney, Agent, or Firm* — Fitzpatrick, Cella, Harper & Scinto

(57) ABSTRACT

A video editing apparatus comprises an input unit that inputs first video data and second video data; a subject size detection unit that detects a representative size of the subject in both the first video data and the second video data as a subject size; a subject size change amount calculation unit that calculates a subject size change amount; a playback speed correction amount setting unit that sets a correction amount for correcting a playback speed of the second video data in accordance with the subject size change amount; a playback speed correction unit that generates third video data by correcting the playback speed of the second video data in accordance with the correction amount; and a video data concatenation unit that concatenates the first video data and the third video data.

9 Claims, 12 Drawing Sheets

| SUBJECT SIZE CHANGE AMOUNT [%] | PLAYBACK SPEED CORRECTION AMOUNT [%] |
|---|---|
| ⋮ | ⋮ |
| 25 | 50 |
| 33 | 33 |
| 50 | 0 |
| 100 | 0 |
| 200 | 0 |
| 300 | −33 |
| 400 | −50 |
| 500 | −60 |
| ⋮ | ⋮ |
| 1000 | −80 |
| 1010 | −80 |
| ⋮ | ⋮ |

FIG. 4
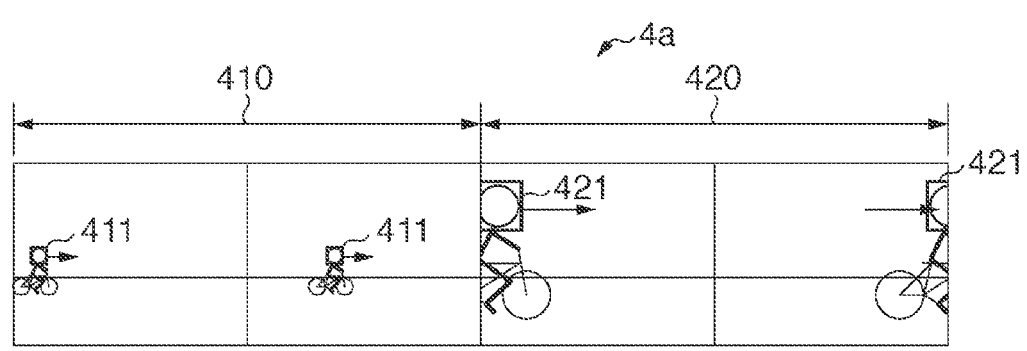
BEFORE SPEED CORRECTION
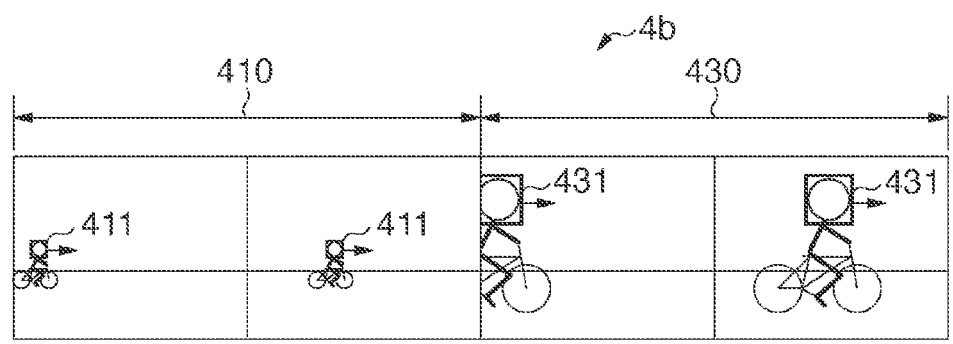
AFTER SPEED CORRECTION

FIG. 7

| DEPTH MOVING AMOUNT [%] | DEPTH MOVEMENT ADJUSTMENT AMOUNT [%] |
|---|---|
| ⋮ | ⋮ |
| −20 | 20 |
| −10 | 10 |
| 0 | 0 |
| 10 | −10 |
| 20 | −20 |
| 30 | −30 |
| 40 | −40 |
| ⋮ | ⋮ |
| 100 | −100 |
| 110 | −100 |
| ⋮ | ⋮ |

700

VIDEO EDITING APPARATUS AND VIDEO EDITING METHOD

BACKGROUND OF THE INVENTION

1. Field of the Invention

The present invention relates to video editing technology for concatenating plural pieces of video data.

2. Description of the Related Art

In recent years, it has become common to provide various devices, such as a digital video camera, a digital camera, a digital single-lens reflex camera, a mobile phone, a personal digital assistant, and a mobile music player, with a movie-capturing function. The increased capacity of data storage media such as hard disk drives and memory cards, has caused a significant increase in the amounts of video data possessed by individuals. Furthermore, there is an increasing number of opportunities for captured videos to be viewed by an unspecified number of users, as a result of the spread in services that allow users to upload their video data to the Internet and share and view the data with other users, an increasing number of network-compatible TVs, and so on.

Generally, in order to view a video captured by a video camera or the like, the viewing time must be the same as the amount of time spent to capture a video. In view of this, a user selectively views a captured video by, for example, directly selecting a time interval of video data to be viewed (hereinafter referred to as a "target viewing interval") with use of the random access function called the "chapter menu" function, the thumbnail display on a file-by-file basis or the like, or fast forwarding video data where appropriate during playback.

However, many users not only select target viewing intervals in video data as described above, but also perform editing on video data itself by, for example, extracting target viewing intervals from video data and concatenating those intervals. An example of basic video editing processing is creating an edited movie by concatenating a plurality of target viewing intervals in video data and performing various types of processing as necessary, such as combining graphic videos, providing visual effects (such as a transition effect) to the concatenated portions between the intervals, and adding background music.

Such video editing processing requires expertise regarding video and execution of operations using special tools, so it is difficult for ordinary users. In addition, selecting necessary pieces of video data or intervals from time-based video data is a troublesome operation.

In view of this, technology for automatically performing video editing using a template file is known as technology that automatically generates an edited movie in which plural pieces of video data are concatenated (for example, Japanese Patent Laid-open No. 2009-55152). Material boxes in which video data is to be inserted, effects, background music, and transitions are pre-defined according to a time code in the template file. By analyzing metadata of each material box in the template file as well as metadata of video data, a video editing apparatus inserts video data that has the same metadata as that in the template file in each material box in the template file.

However, there are the following problems with the above-described video editing processing using the template file. For example, a great difference in the subject size between two videos, in which the same subject moves continuously, causes the speed of movement of the subject (moving speed) to look different. In the case where two such videos are concatenated and the resultant edited movie is played back, the sequence of the movie looks unnatural in particularly the concatenated portion and accordingly gives a feeling of visual unpleasantness to the user. There is also a problem in that the occurrence of a change in the movement of the subject, which is unexpected to the user, causes the eye movement of the user to increase and accordingly places a physical burden such as eyestrain on the user.

The present invention enables two pieces of video data that include the same subject to be concatenated with each other such that the movement of the subject becomes a natural sequence therebetween, thereby reducing the feeling of visual unpleasantness.

SUMMARY OF THE INVENTION

According to one aspect of the present invention, there is provided a video editing apparatus comprises: an input unit that inputs first video data and second video data in which the same subject is captured; a subject size detection unit that detects a representative size of the subject in both the first video data and the second video data as a subject size; a subject size change amount calculation unit that calculates a proportion of the subject size in the second video data to the subject size in the first video data as a subject size change amount; a playback speed correction amount setting unit that sets a correction amount for correcting a playback speed of the second video data in accordance with the subject size change amount by referring to a table; a playback speed correction unit that generates third video data by correcting the playback speed of the second video data in accordance with the correction amount set by the playback speed correction amount setting unit; and a video data concatenation unit that concatenates the first video data and the third video data so as to enable continuous playback of the first video data and the third video data, wherein a relationship between the subject size change amount and the correction amount for correcting the playback speed of the second video data is set in advance in the table such that the playback speed of one of the first video data and the second video data that has a larger subject size is slower than the playback speed of the other video data.

According to another aspect of the present invention, there is provided a video editing method used in a video editing apparatus comprising an input unit, a subject size detection unit, a subject size change amount calculation unit, a playback speed correction amount setting unit, a playback speed correction unit, and a video data concatenation unit, the method comprises: an input step, performed by the input unit, of inputting first video data and second video data in which the same subject moves and that have the same playback speed; a subject size detection step, performed by the subject size detection unit, of detecting a representative size of the subject in both the first video data and the second video data as a subject size; a subject size change amount calculation step, performed by the subject size change amount calculation unit, of calculating a proportion of the subject size in the second video data to the subject size in the first video data as a subject size change amount; a playback speed correction amount setting step, performed by the playback speed correction amount setting unit, of setting a correction amount for correcting a playback speed of the second video data in accordance with the subject size change amount by referring to a table in which a relationship between the subject size change amount and the correction amount for correcting the playback speed of the second video data is set in advance such that the playback speed of one of the first video data and the second video data that has a larger subject size is slower than the playback speed of the other video data; a playback speed correction step, performed by the playback speed correction unit, of generating third video data by correcting the playback speed of the second video data in accordance with the correction amount set in the playback speed correction amount setting step; and a video data concatenation step, performed by the video data concatenation unit, of concatenating the first video data and the third video data so as to enable continuous playback of the first video data and the third video data.

The present invention enables two pieces of video data that include the same subject to be concatenated with each other such that the movement of the subject becomes a natural sequence therebetween, thereby reducing the feeling of visual unpleasantness.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a diagram showing examples of an edited movie according to the first embodiment.

FIG. 7 is a diagram showing an example of a depth movement adjustment amount table according to the second embodiment.

DESCRIPTION OF THE EMBODIMENTS

Hereinafter, exemplary embodiments of the present invention will be described in detail with reference to the drawings. Note that the following exemplary embodiments are not intended to limit the scope of the present invention as defined in the claims. It is also noted that not all combinations of the features described in the exemplary embodiments are essential to the means for solving the problem of the present invention.

First Embodiment

Apparatus Configuration

Figure 1:
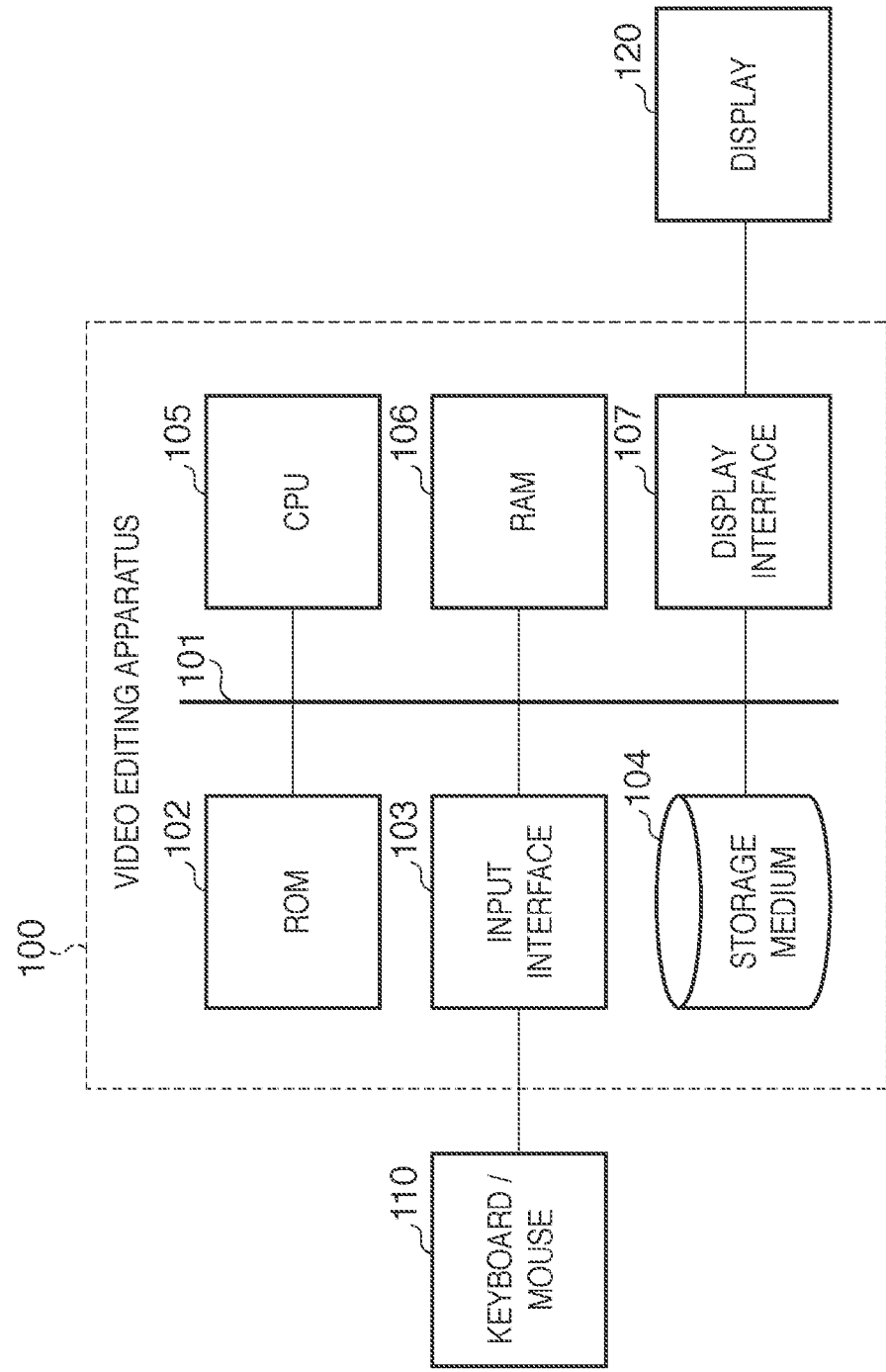
FIG. 1 is a block diagram showing the hardware configuration of a video editing apparatus according to a first embodiment.

FIG. 1 is a block diagram showing the hardware configuration of a video editing apparatus according to the present embodiment. In FIG. 1, reference numeral 100 denotes a main body of the video editing apparatus that edits video data and generates edited movie data. Reference numeral 110 denotes a keyboard/mouse that converts an operation from a user into electric signals. Reference numeral 120 denotes a display such as a liquid crystal display, a plasma display, or a CRT display that displays an operation screen or a video being played back, given from the video editing apparatus 100. The video editing apparatus 100 is configured by a bus 101, a CPU 105, a ROM 102, and a RAM 106. The video editing apparatus 100 further includes a storage medium 104, an input interface 103, and a display interface 107. The storage medium 104 stores various types of data such as video data and edited movie data. The storage medium 104 also stores an OS and processing programs executed by the video editing apparatus 100, and to be specific, it is a hard disk drive, an SSD, a CD-ROM or the like. The storage medium 104 may be housed within the casing of the video editing apparatus 100, or may be connected to the video editing apparatus 100 via a network or the like. The CPU 105 is an arithmetic unit that executes a start-up program, the OS, and the processing programs of the video editing apparatus. The bus 101 provides the CPU 105 with the communication function to read or write data with the other blocks. The ROM 102 stores programs for starting up the video editing apparatus 100. When the video editing apparatus 100 is powered on, the programs stored in the ROM 102 are read and executed by the CPU 105, and initial settings for various modules, the start-up of the OS, and so on are carried out. The RAM 106 is a storage medium that temporarily stores data when the CPU 105 executes processing programs. The display interface 107 converts the output from the video editing apparatus 100 (for example, screen information for display of video data, for display of edited movie data, or for display of various graphical user interfaces) into a signal that can be processed by the display 120, and outputs that signal. The input interface 103 converts the electric signal from the keyboard/mouse 110 into digital information that can be processed by the CPU 105, and notifies the CPU 105 of that information.

Figure 2:
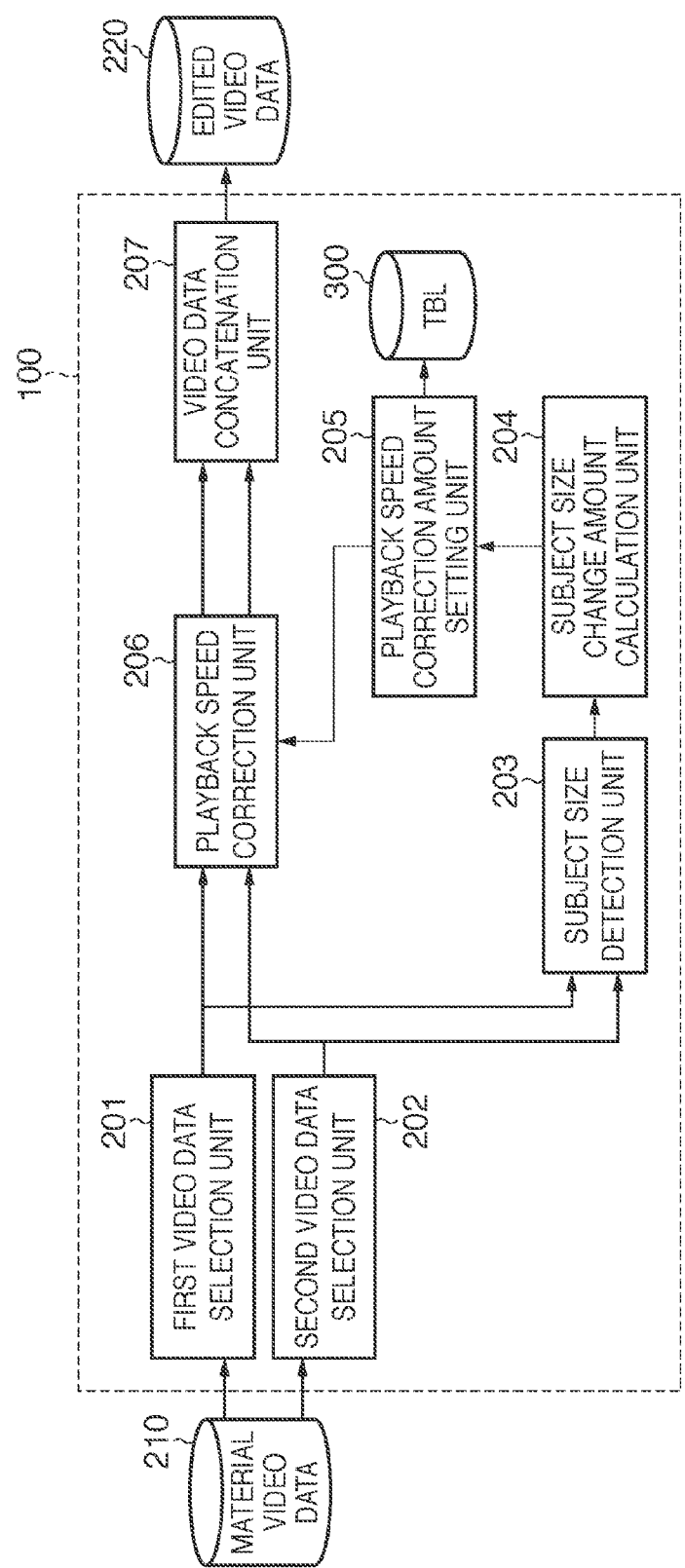
FIG. 2 is a block diagram showing the functional configuration of the video editing apparatus according to the first embodiment.

FIG. 2 is a block diagram showing the functional configuration of the video editing apparatus 100. As shown in FIG. 2, the video editing apparatus 100 is configured by first and second video data selection units 201 and 202, a subject size detection unit 203, a subject size change amount calculation unit 204, a playback speed correction amount setting unit 205, a playback speed correction unit 206, and a video data concatenation unit 207. The playback speed correction amount setting unit 205 refers to a playback speed correction table 300. The video editing apparatus 100 inputs material video data 210 targeted for editing, performs editing processing on the data, and outputs edited movie data 220, which is the video data obtained after the editing. Here, the material video data 210 is divided in advance into individual files in units of capturing through, for example, on/off operations of a video camera, and is stored in the storage medium 104. The following description of the present embodiment is given assuming that the material video data 210 is uncompressed video data, but if the material video data 210 is compressed video data, it may be decoded at the time of reading, for example.

The first video data selection unit 201 selects and reads out first video data from the material video data 210 based on an operation input by a user (not shown). Likewise, the second video data selection unit 202 selects and reads out second video data from the material video data 210 based on the operation input by the user (not shown). It is assumed herein that the first video data and the second video data both are video data having the same playback speed and constituted by a plurality of video frames in which the same object moves continuously, and that they are selected from the material video data 210 by visual confirmation by a user, for example. Note that the method of video selection employed in the first and second video data selection units 201 and 202 is not limited to visual observation by a user. For example, videos in which the same subject moves continuously and that are close in time may be automatically selected based on the results of processing performed on each piece of video data held in the material video data 210, the processing including detecting a subject through face detection or the like, detecting the direction of movement of a subject based on a change in the detected position of the subject, detecting the similarity of the capturing date and time, and the like. In the case where there are a plurality of subjects, which are persons, and each subject moves differently, a subject may be identified by face recognition.

The subject size detection unit 203 detects a representative size of a subject as a subject size for both the first video data and the second video data that include movement of the same subject. The first video data and the second video data each include a plurality of video frames, and it is thought that in both the first video data and the second video data, the subject sizes in the respective video frames are approximately the same. Accordingly, for example, the subject size in a video frame at a predetermined place in order in each of the first and second video data may be determined as a representative subject size. Alternatively, an average of the subject sizes in a plurality of video frames may be determined as a representative subject size. Although an example in which the height of a face detected by face detection is used as a subject size is described in the present embodiment, the subject size is not limited to this example, and for example, the area of a region in which a face has been detected may be used as a subject size.

The subject size change amount calculation unit 204 calculates the proportion (%) of the subject size in the second video data (hereinafter referred to as a "second size") to the subject size in the first video data (hereinafter referred to as a "first size") as a subject size change amount. For example, if the first size is 100 pixels and the second size is 300 pixels, the subject size change amount is 300%.

The playback speed correction amount setting unit 205 sets a playback speed correction amount for correcting the playback speed, based on the subject size change amount calculated as described above. A playback speed correction table 300 is used in this setting, and the details of this playback speed correction table will be discussed later.

The playback speed correction unit 206 generates third video data in which the playback speed of the second video data has been corrected based on the playback speed correction amount. The correction of the playback speed of video data is performed by interpolation or thinning of video frames. For example, in order to reduce the playback speed to 50%, a single video frame that has undergone interpolation processing may be inserted between every video frame. In order to increase the playback speed to 200%, a single video frame may be thinned out once for every two video frames. Note that a known method, such as a method for combining a video frame with the previous or subsequent video frame or a method for calculating a change in position at each pixel or block and placing a pixel or block in an intermediate point between that position change, is applicable in the interpolation processing performed on the video frames. It is also noted that in the case where the video data playback speed correction amount is zero, that is, in the case where speed correction is not performed on the video data, the second video data is transmitted as-is to the video data concatenation unit 207 as the third video data.

The video data concatenation unit 207 concatenates the first video data and the third video data so as to enable continuous playback of the first video data and the third video data, and outputs the resultant data as the edited movie data 220.

Playback Speed Correction Table

Following is a detailed description of the playback speed correction table 300. In the present embodiment, the amount of change in the moving speed of the subject between the first video data and the second video data is regulated using the playback speed correction table 300, such that a change in the moving speed of the subject feels visually natural when the first video data and the second video data are concatenated with each other. Here, it is thought that the amount of change (%) in the subject size between video data pieces in which the same subject moves continuously, like between the first video data and the second video data, is approximately equal to the amount of change (%) in the moving speed of the subject in the video frames. Accordingly, by associating the subject size change amount (%) and the correction amount (%) for correcting the playback speed of the second video data with each other, substantially the playback speed correction amount (%) relative to the amount of change (%) in the moving speed of the subject is set in the playback speed correction table 300.

The playback speed correction amounts set in the playback speed correction table 300 are generated in advance based on statistical data obtained by collecting results indicating to what extent a change in the moving speed of a subject in video frames between concatenated video data pieces is permissible. Specifically, in the case where the moving speed changes between video frames in which a subject moves, first of all, a permissible amount of change that is considered by a user as natural movement without the feeling of visual unpleasantness is acquired using a statistical technique in which a plurality of users are involved as samples, and the acquired change amount is defined as a permissible speed change amount. Then, a playback speed correction amount is calculated and set in advance for each subject size change amount such that the amount of change in the moving speed of the subject in video frames between the first video data and the second video data falls within the range of the above permissible speed change amount. Furthermore, the playback speed correction amount for the second video data is set such that the playback speed of the one of the first video data and the second video data that has a larger subject size is slower than that of the other video data.

Figure 3:
FIG. 3 is a diagram showing an example of a playback speed correction table according to the first embodiment.

FIG. 3 shows an example of data held in the playback speed correction table 300. As described above, the playback speed correction table 300 is configured to show the relationship between pairs of the subject size change amounts and the playback speed correction amounts. The playback speed correction amount indicates the amount of correction for correcting the playback speed of the second video data and specifically defines the proportion of the correction in a percentage, a negative value for the playback speed correction amount indicating the proportion according to which the playback speed of the second video data is reduced, and a positive value indicating the proportion according to which the playback speed of the second video data is increased. Referring to FIG.

3, for example, the playback speed correction amount for the subject size change amount of 300% is −33%, which indicates that the playback speed of the second video data is reduced by 33% in this case, that is, the playback speed is corrected such that it becomes 67% of the original playback speed. The playback speed correction amount for the subject size change amount of 25% is 50%, which indicates that the playback speed of the second video data is increased by 50% in this case, that is, the playback speed is corrected such that it becomes 150% of the original playback speed. In the case where the subject size change amount is in the range of 50% to 200%, the playback speed correction amount is 0% because, as described above, the subject size change amount within that range corresponds to the permissible speed change amount in the moving speed of the subject. This, in other words, indicates that the playback speed of the second video data does not need to be corrected. Hereinafter, the range of subject size change amounts that does not require the correction of the playback speed is referred to as a permissible size change amount.

By correcting the playback speed of the second video data based on the playback speed correction table 300 in this way, the amount of change in the moving speed of the subject between the first video data and the second video data falls within the range of the permissible speed change amount (between 50% and 200%). Note that in the case where the subject size change amount is very large, that is, in the case where the subject size change amount exceeds a predetermined maximum change amount (e.g., 1000%), the correction amount corresponding to that subject size change amount is limited to a predetermined maximum correction amount (e.g., −80%) in order to avoid excessive correction. Note that although the maximum change amount is 1000% in the example of FIG. 3, a similar limitation is also provided for the case where the subject size change amount is very small. Specifically, another maximum change amount for the subject size may be set to, for example, 10% and another maximum correction amount corresponding to that maximum change amount may be set to, for example, 20%.

Note that although an example in which the playback speed correction amount for the second video data is calculated using the playback speed correction table 300 is described in the present embodiment, the playback speed correction amount may be calculated through computation based on a predetermined calculation equation, instead of using the above-described table. Furthermore, although an example in which the maximum correction amount is set for the playback speed correction amount is described in the present embodiment, such limitations are not always necessary. In other words, the correction amount may be set using a different method or equation as long as the correction amount can be set such that the playback speed is reduced in accordance with an increase in the subject size change amount.

Furthermore, although the above description has been given assuming that the playback speed correction amount, which is set using the playback speed correction table 300, is the correction amount for the second video data, it is sufficient in the present embodiment that the speed can be corrected such that the playback speed of one video data that has a larger subject size is slower than that of the other video data. Accordingly, the playback speed correction amount may be set as a correction amount for the first video data.

Example of Edited Movie

FIG. 4 shows examples of the edited movie obtained by the video editing apparatus 100 according to the present embodiment. 4a shows an example of an edited movie obtained in the case where pieces of video data are concatenated without speed correction, and 4b shows an example of an edited movie obtained in the case where pieces of video data are concatenated after speed correction. In 4a and 4b, reference numerals 410, 420, and 430 denote first video data, second video data, and third video data, respectively, and the rectangles indicated by 411, 421, and 431 indicate the ranges of the first video data, the second video data, and the third video data, respectively, in which a subject has been detected. The direction and size of the arrows attached to the subject detection ranges 411, 421, and 431 indicate the moving speed of the subject in video frames. Note that, to simplify the description, the first video data 410, the second video data 420, and the third video data 430 each are constituted by two video frames in the example described below.

In 4a, the subject 421 in the second video data 420 is larger in size than the subject 411 in the first video data 410, and accordingly the subject 421 moves faster in the video frames. In the present embodiment, in the case where the amount of change (%) in the size of the subject 421 relative to that of the subject 411 exceeds a predetermined permissible size change amount, the amount of change in the moving speed of the subject is suppressed by correcting the playback speed of the second video data 420 as shown in 4b. In other words, the third video data 430 is generated such that the playback speed of the second video data 420 is reduced in accordance with the subject size change amount (%) of the second video data 420 relative to the first video data 410. It can be seen from the third video data 430 that the moving speed of the subject 431 is slower than that of the subject 421 in the second video data 420. In the third video data 430, the playback speed of the second video data is corrected so as to be reduced more with increasing subject size change amount (%) of the second video data 420 relative to the first video data 410. This enables the amount of change in the moving speed of the subject to be controlled so as not to exceed the range of the permissible speed change amount (between 50% and 200%), which is based on the statistical data.

Note that a face detection technique is used to detect a subject in each piece of video data. In the case where a subject is not a person, the subject may be detected using a known technique such as matching of hue, color saturation, brightness histogram, texture, and shape.

Video Editing Processing

Figure 5:
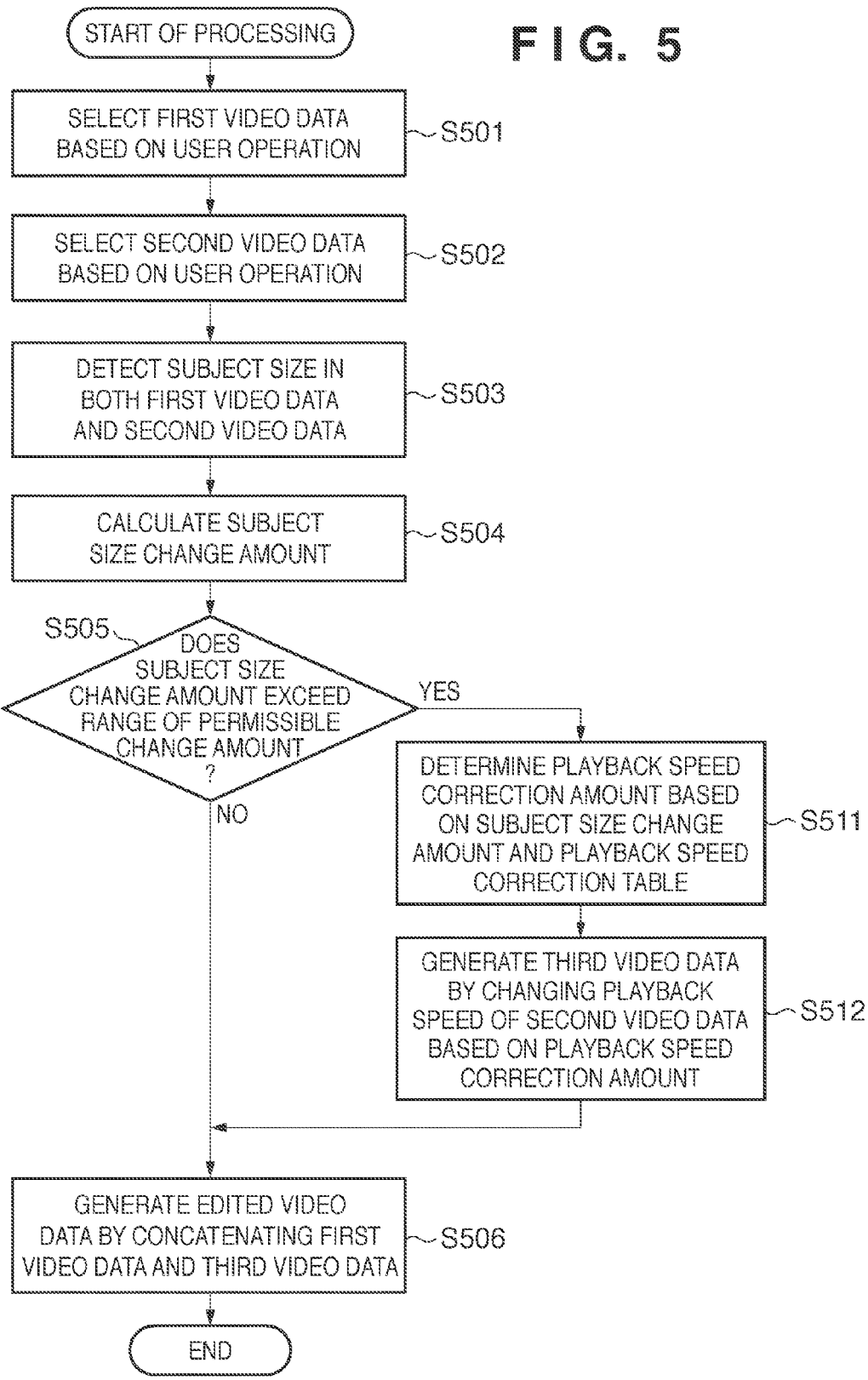
FIG. 5 is a flowchart showing video editing processing according to the first embodiment.

Following is a description of the video editing processing according to the present embodiment with reference to the flowchart of FIG. 5. First, in step S501, the first video data selection unit 201 selects the first video data from the material video data 210 based on a user operation. Next, in step S502, the second video data selection unit 202 selects the second video data from the material video data 210 based on the user operation. It is assumed that the second video data selected herein is video data in which the same subject as in the first video data moves continuously, and in the present embodiment, the second video data is selected by visual observation by the user as described above. Then, in step S503, the subject size detection unit 203 detects the subject size in both the first video data and the second video data. In the case where the subject is a person, the detection of the subject size is performed by performing face detection on each piece of image data, performing face recognition between pieces of video data, and detecting the height of a face recognized as the same. In the case where the subject is not a person, a region of the subject is cut out based on a motion vector from each piece of video data, and the height of a region that matches in hue, color saturation, brightness histogram, texture, and shape between pieces of video data is detected. Then, in step S504, the subject size change amount calculation unit 204 calculates the subject size change amount. The subject size change amount as used herein is represented by the proportion (%) of the subject size in the second video data, detected in step S503, to the subject size in the first video data, detected in step S503.

Then, in step S505, it is determined whether or not the subject size change amount exceeds the range of the permissible size change amount. If the subject size change amount exceeds that range, the processing proceeds to step S511, in which the playback speed correction amount setting unit 205 sets the playback speed correction amount based on the subject size change amount and the playback speed correction table 300. The permissible size change amount for the subject size as used herein refers to, as described above, the range of subject size change amounts for which the playback speed correction amount is set to zero in the playback speed correction table 300, and it corresponds to the above-described permissible speed change amount. Then, in step S512, the playback speed correction unit 206 generates the third video data in which the playback speed of the second video data has been increased or decreased based on the playback speed correction amount. The processing then proceeds to step S506, in which the video data concatenation unit 207 generates edited movie data by concatenating the first video data and the third video data, and thereafter the processing ends.

On the other hand, if it has been determined in step S505 that the subject size change amount is within the range of the permissible size change amount, the processing proceeds to step S506. In step S506, the video data concatenation unit 207 obtains, as the third video data, the second video data on which the correction of the playback speed is not performed by the playback speed correction unit 206, and generates edited movie data by concatenating the first video data and the third video data, and thereafter the processing ends.

According to the present embodiment as described above, in the case where two videos in which the same subject moves continuously are concatenated with each other, the playback speed is controlled in accordance with the subject size change amount between the videos such that the amount of change in the moving speed in video frames falls within a predetermined range. In other words, the playback speed of one video data that has a larger subject size is corrected so as to be slower than that of the other video data, which reduces unnaturalness in the concatenated portion between the videos during playback of the edited movie obtained by the concatenation and thereby reduces the feeling of unpleasantness or a physical burden the user faces.

Second Embodiment

Following is a description of a second embodiment according to the present invention. The above first embodiment is described taking the example of the case where the playback speed is changed based on the proportion of subject sizes (size change amount) between concatenated pieces of video data. In the second embodiment, the playback speed is changed in consideration of, in addition to the same proportion of subject sizes as described above in the first embodiment, a movement of the subject in the depth direction.

Apparatus Configuration

The hardware configuration of a video editing apparatus according to the second embodiment is the same as the block diagram shown in FIG. 1 in the above-described first embodiment, and therefore descriptions thereof have been omitted. The playback speed correction table used in the second embodiment is also the same as that described in the first embodiment with reference to FIG. 3, and therefore descriptions thereof have been omitted.

Figure 6:
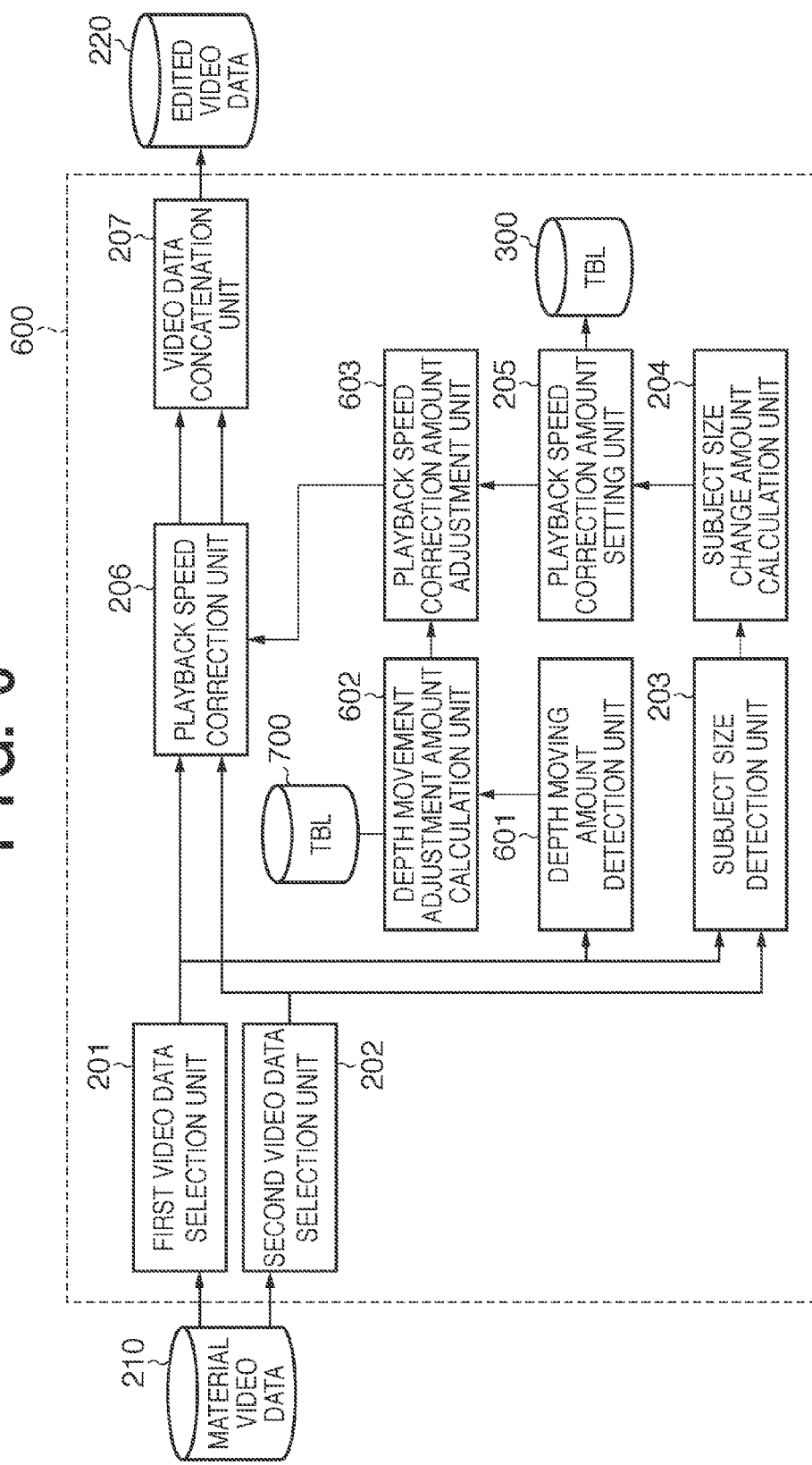
FIG. 6 is a block diagram showing the functional configuration of a video editing apparatus according to a second embodiment.

FIG. 6 is a block diagram showing the functional configuration of a video editing apparatus 600 according to the second embodiment. In FIG. 6, the same reference numerals have been given to constituent elements that are similar to those in FIG. 2 in the above-described first embodiment, and descriptions thereof have been omitted. The video editing apparatus 600 of the second embodiment is configured by adding a depth moving amount detection unit 601, a depth movement adjustment amount calculation unit 602, and a playback speed correction amount adjustment unit 603 to the video editing apparatus 100 of the first embodiment. The depth movement adjustment amount calculation unit 602 refers to a depth movement adjustment amount table 700.

Figure 8:
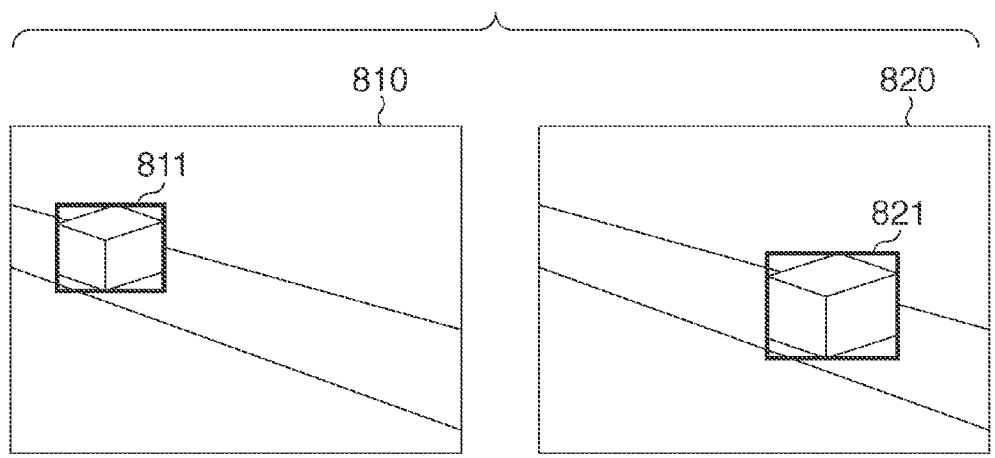
FIG. 8 is a diagram showing a concept of a depth moving amount according to the second embodiment.

The depth moving amount detection unit 601 detects the amount of movement of a subject in the depth direction in the first video data. The amount of movement in the depth direction as used in the second embodiment refers to the rate of increase (%) in subject size per unit time. Here, the concept of the depth moving amount is described with reference to FIG. 8. In FIG. 8, reference numerals 810 and 820 denote snapshots of video frames in the first video data, the video frame 820 being a frame captured one unit of time after capture of the video frame 810. Reference numeral 811 denotes a region of a subject detected in the video frame 810, and reference numeral 821 denotes a region of the subject detected in the video frame 820. In FIG. 8, the depth moving amount detected in the second embodiment is expressed by the following equation.

Depth Moving Amount=(Height of Subject Region 821−Height of Subject Region 811)/Height of Subject Region 811

Note that the method for calculating the depth moving amount is not limited to the above example using the rate of increase/decrease in the height of the subject region, and the depth moving amount may be calculated by using the rate of increase/decrease in the area of the subject region or by mapping the subject region in three-dimensional space.

The depth movement adjustment amount calculation unit 602 calculates the amount of adjustment of the playback speed correction amount. Specifically, a depth movement adjustment amount is acquired from the depth movement adjustment amount table 700, based on the depth moving amount detected by the depth moving amount detection unit 601. The details of this depth movement adjustment amount table 700 will be discussed later.

The playback speed correction amount adjustment unit 603 adjusts the playback speed correction amount based on the depth movement adjustment amount calculated by the depth movement adjustment amount calculation unit 602. For example, in the case where the playback speed correction amount is −50% and the depth movement adjustment amount is −20%, the adjusted playback speed correction amount is −40% as a result of reducing −50% by 20%.

Depth Movement Adjustment Amount Table

Following is a detailed description of the depth movement adjustment amount table 700. In the second embodiment, the playback speed correction amount for the second video data, set by the playback speed correction amount setting unit 205 in the same manner as in the above-described first embodiment, is adjusted in accordance with the amount of adjustment determined by the depth movement adjustment amount table 700.

FIG. 7 shows an example of data held in the depth movement adjustment amount table 700. The depth movement adjustment amount table 700 is configured to show the relationship between pairs of the depth moving amounts and the depth movement adjustment amounts. Movement of a subject in the depth direction involves an increase or decrease in the moving speed of the subject in video frames. For example, in the case of a video in which a subject moves toward the front, the moving speed of the subject generally increases in video frames, whereas in the case of a video in which a subject moves toward the back, the moving speed of the subject generally decreases in video frames. Accordingly, in the second embodiment, for a subject that moves toward the front, the playback speed is reduced less by reducing the speed adjustment amount, whereas for a subject that moves toward the back, the playback speed is reduced more by increasing the speed adjustment amount, thus obtaining more natural edited movie data. For example, also as shown in FIG. 7, in the case of a video in which the subject size increases by 10% in the depth direction (that is, the depth moving amount is 10%), the playback speed correction amount is defined so as to be reduced by 10% (that is, so as to set the depth movement adjustment amount to −10%), assuming that the moving speed is also predicted to be increased by 10%. However, in order to prevent the inversion of the correction amount, the adjustment amount is no longer increased after the depth adjustment amount has reached 100%. Note that although the depth movement adjustment amount relative to the depth moving amount is set such that their absolute values are equal to each other in the example of FIG. 7, it is sufficient that the depth movement adjustment amount is set so as to increase in accordance with an increase in the depth moving amount. In other words, it is sufficient that the playback speed correction amount is set so as to decrease in accordance with an increase in the depth moving amount.

Video Editing Processing

Figure 9:
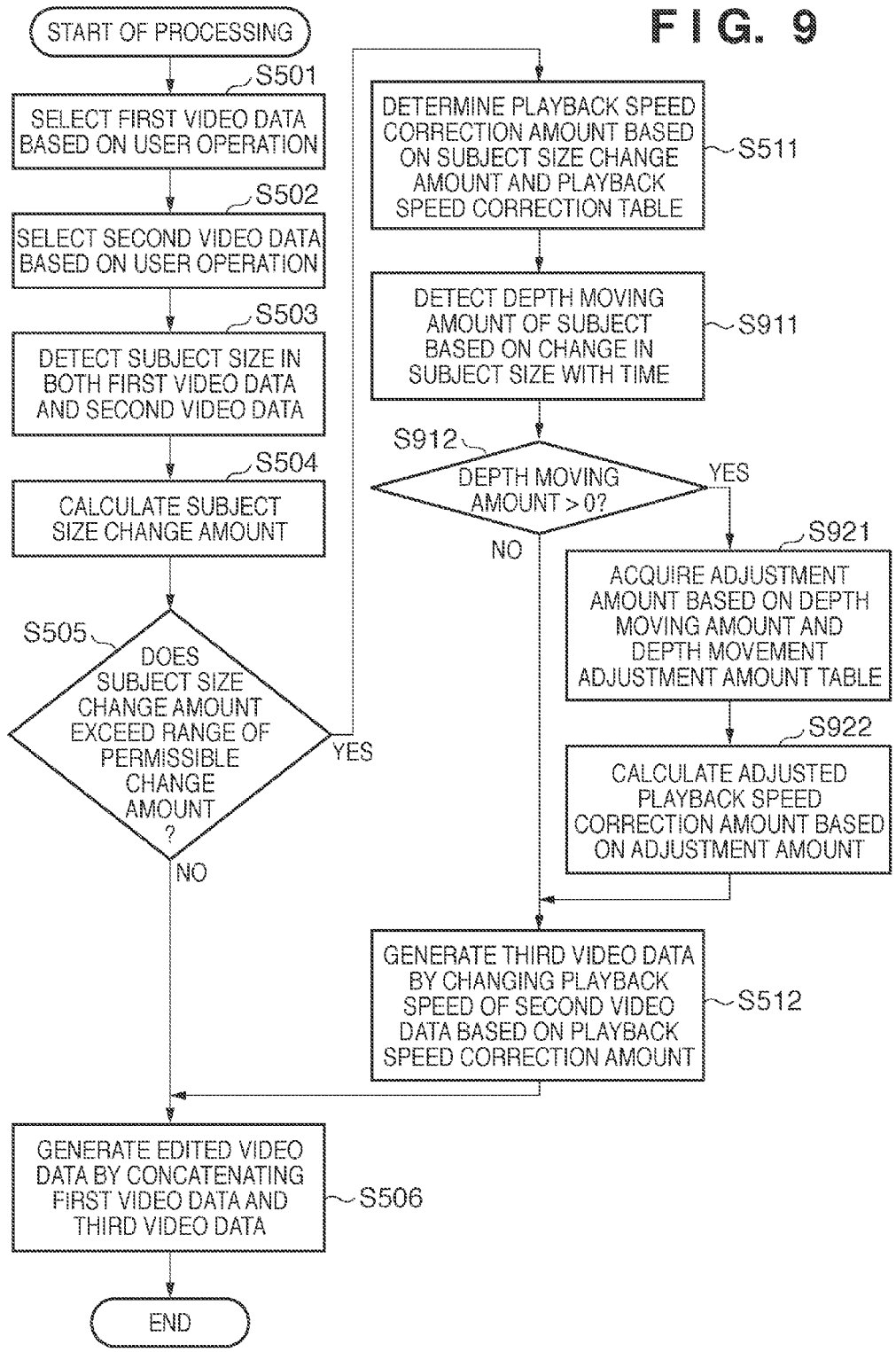
FIG. 9 is a flowchart showing video editing processing according to the second embodiment.

Following is a description of the video editing processing according to the second embodiment with reference to the flowchart of FIG. 9. In FIG. 9, the same reference numerals have been given to steps for performing the same processing as those in FIG. 5 in the above-described first embodiment (steps S501 to step S506, S511, and S512), and descriptions thereof have been omitted.

When the playback speed correction amount is determined in step S511, then in step S911, the depth moving amount detection unit 601 detects the amount of movement in the depth direction (depth moving amount) based on a change in the subject size in the first video data with time. Then, it is determined in step S912 whether or not there is a movement in the depth direction, that is, whether or not the depth moving amount detected in step S911 is a value exceeding zero. If there is a movement in the depth direction, that is, if the depth moving amount detected in step S911 is a value exceeding zero, the processing proceeds to step S921, in which the depth movement adjustment amount calculation unit 602 acquires a depth movement adjustment amount from the depth movement adjustment amount table 700, based on the depth moving amount. Then, in step S922, the playback speed correction amount adjustment unit 603 calculates an adjusted playback speed correction amount from the depth movement adjustment amount and the playback speed correction amount, and the processing proceeds to step S512. On the other hand, if the depth moving amount is zero or less in step S912, the adjustment of the playback speed correction amount is not performed, and the processing proceeds to step S512.

Note that although an example in which two pieces of video data are selected as targets for concatenation is described in the first and second embodiments, similar processing may be performed in sequence on two continuous pieces of video data in the case where three or more pieces of video data are selected. In the case where changes in the playback speed accumulate due to repeated processing, processing for gently returning the playback speed to its original speed in video data may be performed in combination, taking advantage of sensory adaptation.

According to the second embodiment as described above, in addition to the features of the above-described first embodiment, the playback speed is controlled further in accordance with the amount of movement of a subject in the depth direction. Accordingly, even in the case of concatenating videos in which a subject moves in the depth direction, it is possible to reduce the feeling of unpleasantness or a physical burden the user faces during playback of the resultant video obtained by the concatenation.

Third Embodiment

Following is a description of a third embodiment according to the present invention. In the above-described first embodiment, an example in which the playback speed is changed based on the proportion of the sizes of a subject to be concatenated. In the third embodiment, the playback speed is changed in consideration of, in addition to the proportion of the subject sizes as described above in the first embodiment, the influence of camera operations for tracking a subject.

Apparatus Configuration

The hardware configuration of a video editing apparatus according to the third embodiment is the same as the block diagram shown in FIG. 1 in the above-described first embodiment, and therefore descriptions thereof have been omitted. The playback speed correction table used in the third embodiment is also the same as that described in the first embodiment with reference to FIG. 3, and therefore descriptions thereof have been omitted.

Figure 10:
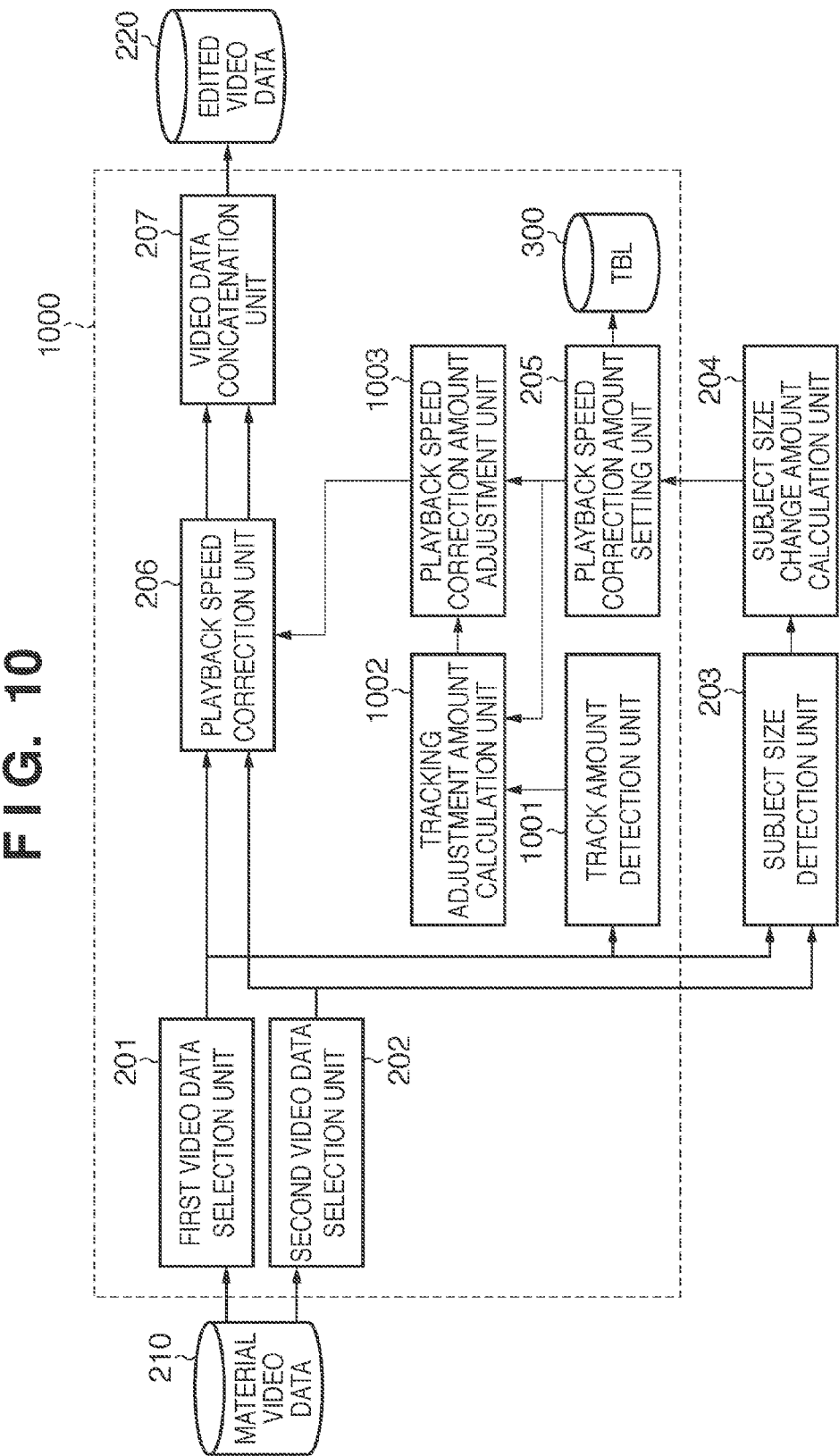
FIG. 10 is a block diagram showing the functional configuration of a video editing apparatus according to a third embodiment.

FIG. 10 is a block diagram showing the functional configuration of a video editing apparatus 1000 according to the third embodiment. In FIG. 10, the same reference numerals have been given to constituent elements that are similar to those shown in FIG. 2 in the above-described first embodiment, and descriptions thereof have been omitted. The video editing apparatus 1000 according to the third embodiment is configured by adding a track amount detection unit 1001, a tracking adjustment amount calculation unit 1002, and a playback speed correction amount adjustment unit 1003 to the video editing apparatus 100 of the first embodiment.

Figure 11:
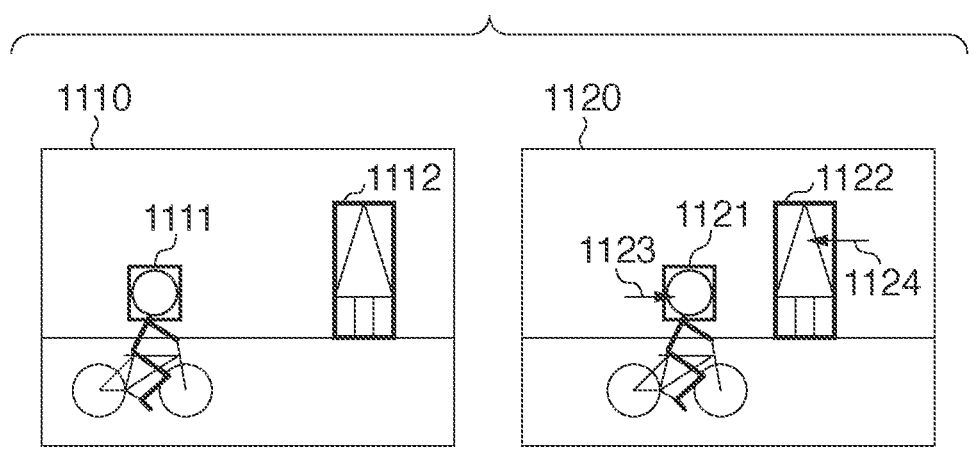
FIG. 11 is a diagram showing a concept of a track amount according to the third embodiment.

The track amount detection unit 1001 detects, from the first video data, a track amount that is the amount of camera motion for tracking a subject. The track amount as used in the third embodiment refers to the proportion (%) of the amount of camera motion relative to the amount of movement of the subject. Here, the concept of the track amount is described with reference to FIG. 11. In FIG. 11, reference numerals 1110 and 1120 denote snapshots of video frames in the first video data, the video frame 1120 being a frame captured one unit of time after capture of the video frame 1110. Reference numerals 1111 and 1121 denote subject regions detected in the video frames 1110 and 1120, respectively, and reference numerals 1112 and 1122 denote characteristic background regions in the video frames 1110 and 1120, respectively. Note that such a characteristic background region is obtained by, for example, extracting edges in each video frame and selecting a region where the number of edges per unit area is large. An arrow 1123 in the video frame 1120 indicates the amount of movement of the subject relative to the video frame 1110, and likewise, an arrow 1124 indicates the amount of movement of the background. In FIG. 11, the track amount detected in the third embodiment is expressed by the following equation.

Track Amount=|Background Moving Amount 1124/
(Background Moving Amount 1124−Subject
Moving Amount 1123)|

For example, if the background moving amount 1124 is −100 pixels (100 pixels to the left in the drawing) and the subject moving amount 1123 is 100 pixels (100 pixels to the right in the drawing), the track amount is 50%.

The tracking adjustment amount calculation unit 1002 calculates a tracking adjustment amount for adjusting the playback speed correction amount, from the track amount detected by the track amount detection unit 1001 and the playback speed correction amount set by the playback speed correction amount setting unit 205, based on an equation for calculating the tracking adjustment amount, which is discussed below.

Below is a description of the equation for calculating the tracking adjustment amount according to the present embodiment. Generally, the amount of change in the position of a subject in continuous video frames decreases with camera operations for tracking the subject, and accordingly the perceived speed of the subject decreases as well. If the perceived speed decreases, a change in speed due to a change in the subject size is less recognized. In other words, in the case of a video that has been captured while tracking a subject with a camera, natural playback is enabled by decreasing the amount of reduction in the playback speed determined by the correction of the above-described first embodiment. In the third embodiment, it is assumed that it is effective to reduce the playback speed correction amount set by the playback speed correction amount setting unit 205 by a certain proportion in order to make a change in speed less recognizable in a video captured while being tracked, and this proportion is defined as a tracking constant (%). Because the tracking adjustment amount calculated by the tracking adjustment amount calculation unit 1002 increases in accordance with an increase in the track amount, the equation for calculating the tracking adjustment amount according to the present embodiment is expressed as follows.

Tracking Adjustment Amount=−Playback Speed Correction Amount×Tracking Constant×Track Amount For example, if the tracking constant is 40%, the track amount is 50% and the playback speed correction amount is −50%, the tracking adjustment amount is calculated as −10% from the above equation. Note that although the description of the third embodiment is given assuming that the equation for calculating the tracking adjustment amount is based on the tracking constant, another equation may be applied as long as the tracking adjustment amount increases in accordance with an increase in the track amount. In other words, it is sufficient that the playback speed correction amount is set so as to decrease in accordance with an increase in the track amount. Alternatively, instead of performing computation based on the equation for calculating the tracking adjustment amount, a table showing pairs of the track amounts and the tracking adjustment amounts may be created and stored in advance and referred to in the case of calculating the tracking adjustment amount.

The playback speed correction amount adjustment unit 1003 adjusts the playback speed correction amount set by the playback speed correction amount setting unit 205, based on the tracking adjustment amount calculated by the tracking adjustment amount calculation unit 1002. For example, in the case where the playback speed correction amount is −50% and the tracking adjustment amount is −10%, the adjusted playback speed correction amount is −45% as a result of reducing −50% by 10%.

Video Editing Processing

Figure 12:
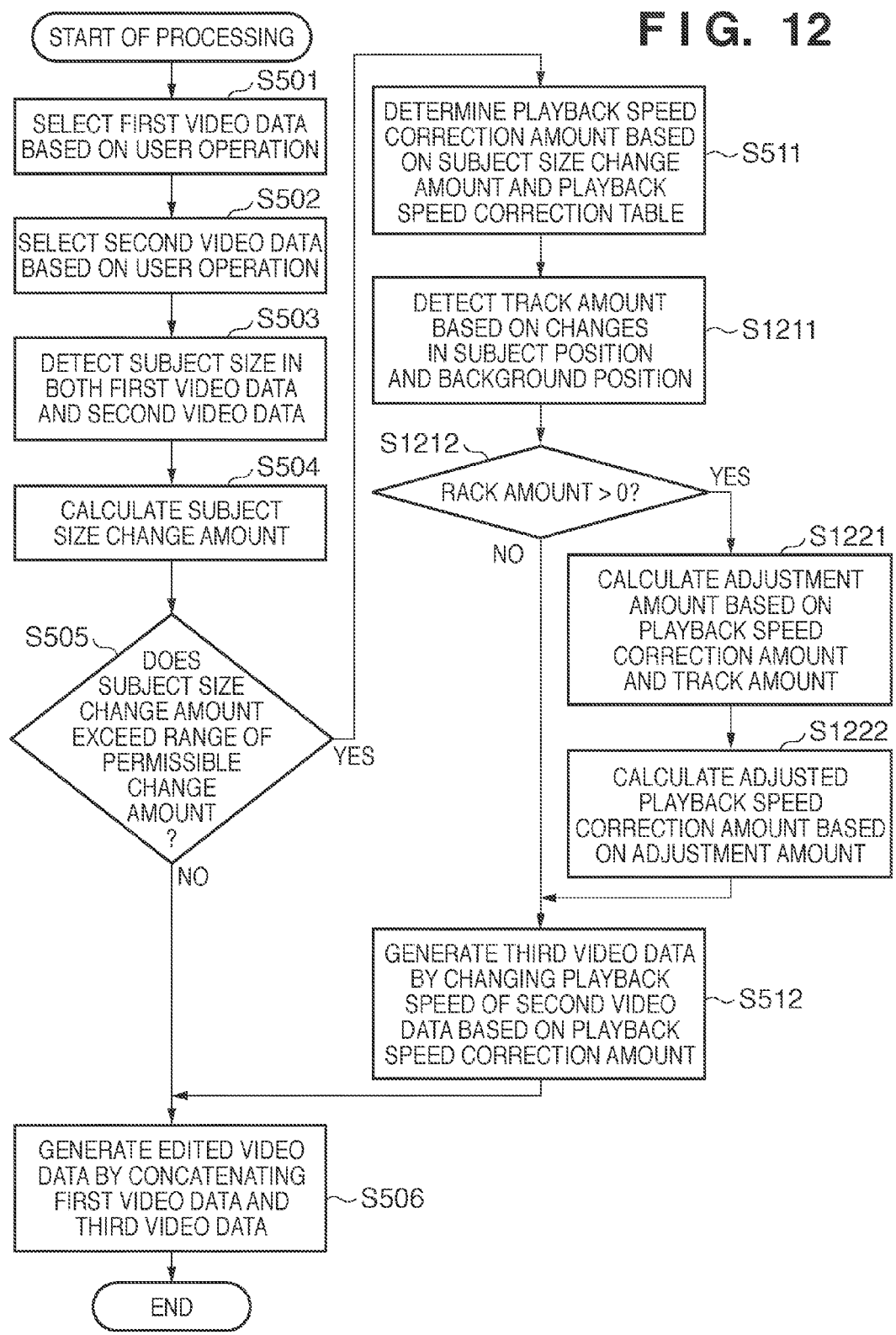
FIG. 12 is a flowchart showing video editing processing according to the third embodiment.

Following is a description of the video editing processing according to the third embodiment with reference to the flowchart of FIG. 12. In FIG. 12, the same reference numerals have been given to steps for performing the same processing as those shown in FIG. 5 in the above-described first embodiment (steps S501 to S506, S511, and S512), and descriptions thereof have been omitted.

When the playback speed correction amount is determined in step S511, then in step S1211, the track amount detection unit 1001 detects the track amount based on changes in the position of the subject and in the position of the background in the first video data. Then, it is determined in step S1212 whether or not tracking has been performed, that is, whether or not the track amount detected in step S1211 is a value exceeding zero. If tracking has been performed, that is, if the track amount detected in step S1211 is a value exceeding zero, the processing proceeds to step S1221, in which the tracking adjustment amount calculation unit 1002 calculates the tracking adjustment amount from the playback speed correction amount and the track amount, based on the equation for calculating the tracking adjustment amount. Then, in step S1222, the playback speed correction amount adjustment unit 1003 calculates the adjusted playback speed correction amount from the tracking adjustment amount and the playback speed correction amount, and the processing proceeds to step S512. On the other hand, if it has been determined in step S1212 that the track amount is 0 or less, the adjustment of the playback speed correction amount is not performed, and the processing proceeds to step S512.

According to the third embodiment as described above, in addition to the features of the above-described first embodiment, the playback speed is further controlled in consideration of the influence of camera operations for tracking a subject such that a reduction in the playback speed decreases in accordance with the track amount. Accordingly, even in the case of concatenating videos in which the subject is being tracked, it is possible to reduce the feeling of unpleasantness or a physical burden the user faces during playback of the resultant video obtained by the concatenation.

Note that the above second and third embodiments are described taking the example of the case where the adjustment amount for the playback speed correction amount set by the playback speed correction amount setting unit 205 is calculated based on the first video data. However, the present invention is not intended to be limited to this example, and the adjustment amount may be calculated based on the second video data.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-097422, filed on Apr. 20, 2010, which is hereby incorporated by reference herein in its entirety.

What is claimed is:

1. A video editing apparatus comprising:
an input unit that inputs first video data and second video data in which the same subject is captured;
a subject size detection unit that detects a representative size of the subject in both the first video data and the second video data as a subject size;
a subject size change amount calculation unit that calculates a proportion of the subject size in the second video data to the subject size in the first video data as a subject size change amount;
a playback speed correction amount setting unit that sets a correction amount for correcting a playback speed of the second video data in accordance with the subject size change amount by referring to a table;
a playback speed correction unit that generates third video data by correcting the playback speed of the second video data in accordance with the correction amount set by the playback speed correction amount setting unit; and
a video data concatenation unit that concatenates the first video data and the third video data so as to enable continuous playback of the first video data and the third video data,
wherein a relationship between the subject size change amount and the correction amount for correcting the playback speed of the second video data is set in advance in the table such that the playback speed of one of the first video data and the second video data that has a larger subject size is slower than the playback speed of the other video data.

2. The video editing apparatus according to claim 1, wherein the correction amount for correcting the playback speed of the second video data is set in the table such that the playback speed of the second video data is reduced in accordance with an increase in the subject size change amount.

3. The video editing apparatus according to claim 2, wherein the correction amount for correcting the playback speed of the second video data is set in the table such that an amount of change in the moving speed of the subject between the first video data and the second video data falls within a range of a permissible speed change amount that is statistically obtained as an amount of change that is visually permissible.

4. The video editing apparatus according to claim 3, wherein in a case where the subject size change amount falls within a range of a permissible size change amount that is a subject size change amount corresponding to the permissible speed change amount, the correction amount for correcting the playback speed of the second video data, corresponding to the subject size change amount, is set to zero in the table.

5. The video editing apparatus according to claim 1, wherein in a case where the subject size change amount exceeds a predetermined maximum change amount, the correction amount for correcting the playback speed of the second video data, corresponding to the subject size change amount, is set to a predetermined maximum correction amount in the table.

6. The video editing apparatus according to claim 1, further comprising:
a depth moving amount detection unit that detects an amount of movement of the subject in a depth direction from the first video data; and
a playback speed correction amount adjustment unit that adjusts the correction amount for correcting the playback speed of the second video data set by the playback speed correction amount setting unit, such that the correction amount decreases in accordance with an increase in the amount of movement in the depth direction,
wherein the playback speed correction unit generates the third video data by correcting the playback speed of the second video data in accordance with the correction amount for correcting the playback speed adjusted by the playback speed correction amount adjustment unit.

7. The video editing apparatus according to claim 1, further comprising:
a track amount detection unit that detects an amount of camera motion for tracking the subject during capture of the first video data as a track amount from the first video data; and
a playback speed correction amount adjustment unit that adjusts the correction amount for correcting the playback speed of the second video data set by the playback speed correction amount setting unit, such that the correction amount decreases in accordance with an increase in the track amount,
wherein the playback speed correction unit generates the third video data by correcting the playback speed of the second video data in accordance with the correction amount for correcting the playback speed adjusted by the playback speed correction amount adjustment unit.

8. A non-transitory computer-readable storage medium storing a computer program for causing a computer to function as units of the video editing apparatus according to claim 1.

9. A video editing method used in a video editing apparatus comprising an input unit, a subject size detection unit, a subject size change amount calculation unit, a playback speed correction amount setting unit, a playback speed correction unit, and a video data concatenation unit,
the method comprising:
an input step, performed by the input unit, of inputting first video data and second video data in which the same subject moves and that have the same playback speed;
a subject size detection step, performed by the subject size detection unit, of detecting a representative size of the subject in both the first video data and the second video data as a subject size;
a subject size change amount calculation step, performed by the subject size change amount calculation unit, of calculating a proportion of the subject size in the second video data to the subject size in the first video data as a subject size change amount;
a playback speed correction amount setting step, performed by the playback speed correction amount setting unit, of setting a correction amount for correcting a playback speed of the second video data in accordance with the subject size change amount by referring to a table in which a relationship between the subject size change amount and the correction amount for correcting the playback speed of the second video data is set in advance such that the playback speed of one of the first video data and the second video data that has a larger subject size is slower than the playback speed of the other video data;

a playback speed correction step, performed by the playback speed correction unit, of generating third video data by correcting the playback speed of the second video data in accordance with the correction amount set in the playback speed correction amount setting step; and a video data concatenation step, performed by the video data concatenation unit, of concatenating the first video data and the third video data so as to enable continuous playback of the first video data and the third video data.

* * * * *